United States Patent [19]

Tatum

[11] Patent Number: 4,643,679

[45] Date of Patent: Feb. 17, 1987

[54] EDUCATIONAL AID FOR SPELLING

[76] Inventor: John A. Tatum, 1045 Atascadero Rd., Morro Bay, Calif. 93442

[21] Appl. No.: 801,409

[22] Filed: Nov. 25, 1985

[51] Int. Cl.$^4$ ............................................. G09B 17/00
[52] U.S. Cl. .................................. 434/167; 434/170; 434/184
[58] Field of Search ...................... 434/167, 170, 184

[56] References Cited

U.S. PATENT DOCUMENTS 4,030,211 6/1977 McGinley ............................ 434/167
4,378,214 3/1983 Scherer ........................... 434/170 X Primary Examiner—William H. Grieb
Attorney, Agent, or Firm—Jerry N. Lulejian

[57] ABSTRACT

The present invention is an educational aid for the teaching of different spellings for each of at least two vowel sounds. It comprises a board marked with the common symbol for each of the vowel sounds. In a circular indentation wedge-shaped pieces are housed, each piece having a spelling for one of the vowel sounds marked thereon. One surface of each piece is colored with the color which exists around the marking of its vowel sound on the board. The other side of each piece is similarly marked but not colored.

3 Claims, 2 Drawing Figures

EDUCATIONAL AID FOR SPELLING

BACKGROUND OF THE INVENTION

The invention relates to educational aids and particularly to educational aids which employ visual and tactile stimulation simultaneously. The present invention is intended to aid in the teaching of the different spellings for each of at least two vowel sounds. This invention is especially useful for the dyslexic student.

It has been known to use colored blocks to teach dyslexic students how to analyze the number of syllables in a word. For example, a teacher would give a student blocks, each of which is colored with one of several different colors, and ask him to place in front of him one of the blocks with a distinctive color for each syllable the student recognizes in a particular word. This technique offers the student the visual and tactile stimulations to reinforce his learning process.

However, the above technique cannot be used to aid the student in learning the different spellings for vowel sounds. Prior to the present invention no one has offered an invention which would enable the dyslexic student to learn the different spellings of vowel sounds by combining simultaneous visual and tactile stimulation.

SUMMARY OF THE INVENTION

The present invention is an educational aid for the teaching of different spellings for each of at least two vowel sounds. It comprises a board marked with the common symbol for each of the vowel sounds. In a circular indentation wedge-shaped pieces are housed, each piece having a spelling for one of the vowel sounds marked thereon. One surface of each piece is colored with the color which exists around the marking of its vowel sound on the board. The other side of each piece is similarly marked but not colored.

The instructor places all of the pieces so that the surfaces with the coloring are face down. The student places pieces within the areas of the board colored and marked with the vowel sound chosen for each piece. When all pieces are placed in the board, the student turns each piece over to expose its coloring. If the coloring matches the colors of the adjacent area of the board containing the correct vowel sound, the student tactilely and visually recognizes a correct choice.

DETAILED DESCRIPTION OF THE INVENTION

The present invention is an educational aid for teaching the different spellings for each of at least two vowel sounds. The present invention was invented in response to the particular needs of the dyslexic student. Of course, dyslexia is simply a broad term for a myriad of learning disorders. It is important to simultaneously combine learning stimuli to as many of the five senses of the student as is possible in order to aid him in his learning.

The present invention employs a combination of visual and tactile stimulation when it aids the student in learning the different spellings for vowel sounds.

Figure 1:
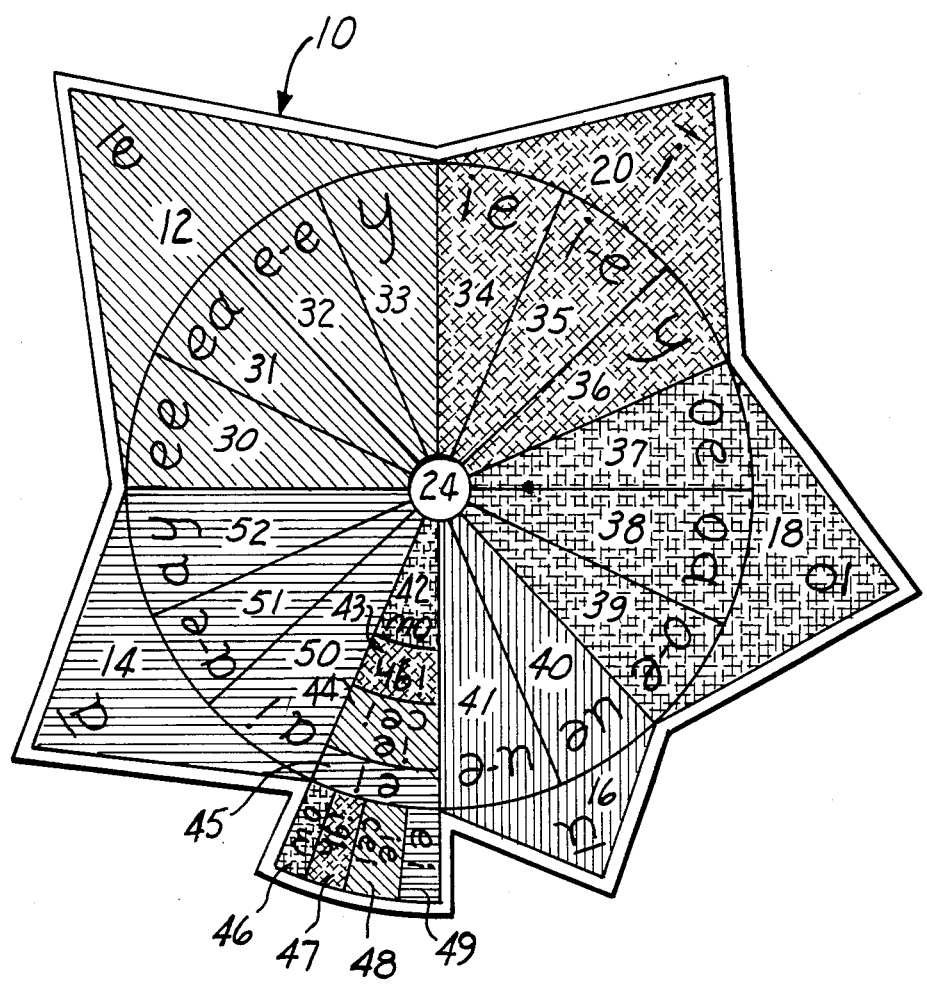
FIG. 1 is a top view of the board and pieces of the present invention.

Referring specifically to FIG. 1, the preferred embodiment of the invention is shown. Specifically, the present invention (in its preferred embodiment) comprises a board 10 which is basically star-shaped with each of its triangular extremeties 12, 14, 16, 18 and 20 marked with a vowel sound. As can be seen in FIG. 1, the triangular extremeties 12, 14, 16, 18 and 20 are marked with the common symbol for the long vowel sounds e, a, u, o, and i, respectively.

Figure 2:
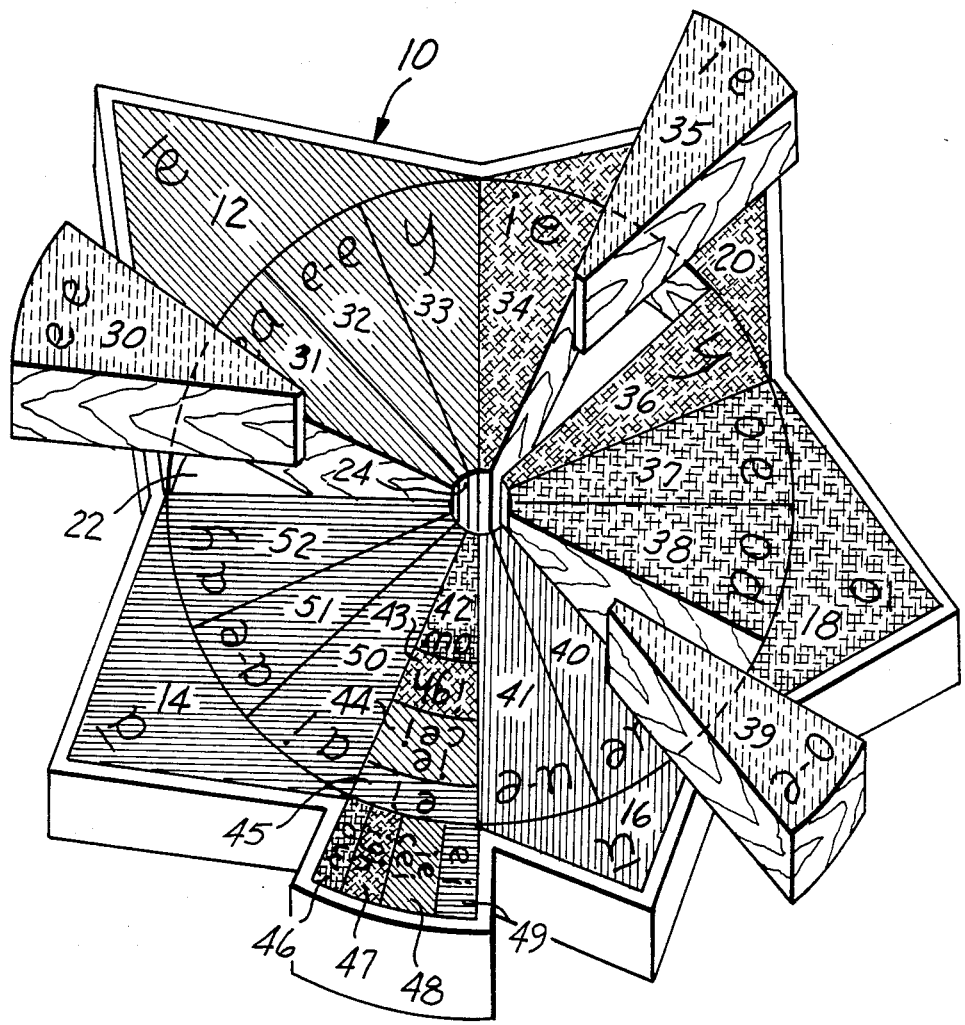
FIG. 2 is a perspective view of the board with some pieces removed and elevated.

Referring specifically to FIG. 2, the board 10 has within its borders a substantially circular indentation 22 which is to receive each of fifteen wedge-shaped pieces 30–41 and 50–52. In addition, the preferred embodiment also includes pieces 42–49 which are odd-shaped but also comprise a wedge-shaped piece when properly assembled.

Each of the pieces 30–52 is marked on each side with a possible spelling of a particular vowel sound. One of the surfaces of each of the pieces is preferrably colored with a color which matches the color which surrounds the triangular periphery 12, 14, 16, 18 and 20 where the commonly used symbol for each piece's vowel sound appears on the board 10. Thus, when the board 10 is properly assembled (as shown in FIG. 1), the spellings which conform to the vowel sound marked in the triangular peripheries 12, 14, 16, 18 and 20 are matched in color to that color which exists in the triangular peripheries 12, 14, 16, 18 and 20.

In operation, the instructor removes all of the pieces 30–52 from the indentation 22 in the board 10 and places them so that the colored surface is face down. Exposed to the student is an uncolored face (unshown) which is marked with the spelling of a particular vowel sound (the same spelling as on the opposite side of each piece). The student recognizes each of the common symbols for vowel sounds in each of the triangular peripheries 12, 14, 16, 18 and 20 and makes choices as to which of the vowel spellings on each of the pieces 20–52 are spellings for each of the vowel sounds symbolically marked on the board 10. The student then places the pieces within the indentation 22 and adjacent the triangular peripheries 12, 14, 16, 18 and 20 that he chooses to be the correct vowel sound for each spelling marked on the pieces 30–52. When the student has completed his choices, he then removes the pieces by placing his finger in the space 24 in the indentation 22 and reverses the piece so that the colored surface with its spelling shows.

Each of the pieces 42–49 are reserved in the preferred embodiment for uncommon spellings of different vowel sounds. The student can place each of these pieces 42–49 within the triangular peripheries 12, 14, 16, 18 and 20 of his choice without placing them within the indentation 22 and only later assemble them within the indentation 22 as shown in FIGS. 1 and 2.

The board 10 and the pieces 30–52 can be made of wood as shown in FIG. 2 or of any other rigid material such as plastic. The board 10 and the pieces 30–52 can be colored by the use of paint.

Therefore, the present invention has combined visual and tactile stimulation in a novel and an obvious manner to aid students in learning the different spellings of vowel sounds.

The preceding disclosure of the preferred embodiment of the present invention is for illustrative purposes only and shall not be considered to define the scope of the present invention. Instead, the scope of the present invention shall be defined by the following claims and their equivalents.

I claim:

1. An educational aid for the teaching of different spellings for each of at least two vowel sounds, comprising:
    a board having common symbols for each of the at least two vowel sounds marked thereon, each common symbol being within a separate area of the board;
    a means for making each separate area of the board visually distinctive;
    at least two pieces for each of the at least two vowel sounds, each piece having two substantially parallel level surfaces, each surface of each of the at least two pieces for each vowel sound being marked with a possible spelling of its vowel sound; and,
    a means for making one of the surfaces of each of the at least two pieces for each vowel sound visually distinctive, the visual distinctiveness being substantially the same as the visual distinctiveness of the separate area of the board which is symbolically marked with its vowel sound.

2. The educational aid in accordance with claim 1 in which the means for making each separate area of the board visually distinctive comprises having each separate area of the board colored with a different color; and,
    the means for making one of the surfaces of each of the at least two pieces for each vowel sound visually distinctive comprises a colored surface with a color different from the color on the surface of the others of the at least two pieces for each vowel sound;
    the color of the surface of each of the at least two pieces for each vowel sound being substantially the same as the color of the separate area of the board marked with its vowel sound.

3. The educational aid in accordance with claim 2 in which the board has a substantially circular indentation for receiving the pieces and the pieces are wedge-shaped and substantially all pieces fit within the circular indentation.

* * * * *